United States Patent
Ganguly et al.

(10) Patent No.: US 10,940,835 B2
(45) Date of Patent: Mar. 9, 2021

(54) DEVICES AND SYSTEMS FOR PREVENTING MISALIGNMENT IN VEHICLE BRAKE ASSEMBLIES

(71) Applicant: Ford Global Technologies, LLC, Dearborn, MI (US)

(72) Inventors: Snehasis Ganguly, Canton, MI (US); Curtis Hargitt, Howell, MI (US); Brian Marvin Lemmer, Dearborn, MI (US); Thomas Stime, Leverkusen (DE); Douglas Nash, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/807,541

(22) Filed: Mar. 3, 2020

(65) Prior Publication Data

US 2020/0198598 A1 Jun. 25, 2020

Related U.S. Application Data

(60) Continuation of application No. 16/412,531, filed on May 15, 2019, now abandoned, which is a division of
(Continued)

(30) Foreign Application Priority Data

Jun. 28, 2013 (DE) ..................... 10 2013 212 558.5

(51) Int. Cl.
*B60T 7/06* (2006.01)
*F16C 11/04* (2006.01)
(Continued)

(52) U.S. Cl.
CPC ................ *B60T 7/06* (2013.01); *B60T 11/18* (2013.01); *F16C 11/04* (2013.01); *G05G 1/44* (2013.01);
(Continued)

(58) Field of Classification Search
CPC . Y10T 74/20528–2054; Y10T 74/2088; Y10T 403/1608; Y10T 403/1616;
(Continued)

(56) References Cited

U.S. PATENT DOCUMENTS 3,340,351 A  9/1967 Tiernan, Jr.
3,388,610 A  6/1968 Pyle et al.
(Continued)

FOREIGN PATENT DOCUMENTS

CN  2481591 Y  3/2002
CN  101100179 A  1/2008
(Continued)

OTHER PUBLICATIONS

Machine Translation of EP 2826680, obtained Apr. 9, 2020.*
(Continued)

*Primary Examiner* — Richard W Ridley
*Assistant Examiner* — Brian J McGovern
(74) *Attorney, Agent, or Firm* — Burr & Forman, LLP

(57) ABSTRACT

A vehicle brake assembly includes an actuation lever coupled to a brake pedal. The brake assembly also includes a push rod of a brake booster. The push rod has a clevis on an end portion thereof. The clevis comprises two prongs. The brake assembly further includes an alignment device seated on each respective prong of the clevis. The alignment devices are configured to collectively guide and position the clevis into alignment with the actuation lever during construction of the brake assembly.

12 Claims, 10 Drawing Sheets

Related U.S. Application Data application No. 15/455,825, filed on Mar. 10, 2017, now abandoned, which is a division of application No. 14/317,792, filed on Jun. 27, 2014, now abandoned.

(51) Int. Cl.
  *B60T 11/18*     (2006.01)
  *G05G 1/44*      (2008.04)
  *G05G 1/50*      (2008.04)

(52) U.S. Cl.
  CPC ..... *G05G 1/506* (2013.01); *F16D 2250/0084* (2013.01); *Y10T 29/49895* (2015.01); *Y10T 74/20528* (2015.01); *Y10T 403/1624* (2015.01)

(58) Field of Classification Search
  CPC . B60T 7/06; B60T 17/00; B60T 11/18; G05G 1/30; G05G 1/44; G05G 1/445; G05G 1/46; G05G 1/50; G05G 1/506
  See application file for complete search history.

(56) References Cited

U.S. PATENT DOCUMENTS

| | | | |
|---|---|---|---|
| 5,971,651 A | 10/1999 | Gomick | |
| 6,152,642 A * | 11/2000 | Berthold | B60T 7/042 24/669 |
| 6,327,930 B1 * | 12/2001 | Ono | B60R 21/09 188/377 |
| 8,607,660 B2 | 12/2013 | Khan et al. | |
| 2002/0023516 A1 * | 2/2002 | Frobel | B60K 23/02 74/512 |
| 2009/0235777 A1 * | 9/2009 | Sand | B60R 21/01 74/560 |
| 2010/0147101 A1 * | 6/2010 | Yamazaki | B60R 21/09 74/512 |
| 2012/0102942 A1 | 5/2012 | Sellinger et al. | |
| 2015/0000458 A1 | 1/2015 | Ganguly et al. | |
| 2015/0331442 A1 | 11/2015 | Ganguly et al. | |
| 2017/0182983 A1 | 6/2017 | Ganguly et al. | |

FOREIGN PATENT DOCUMENTS

| | | | | |
|---|---|---|---|---|
| CN | 201195532 Y | 2/2009 | | |
| CN | 201800698 U | 4/2011 | | |
| CN | 102303595 A | 1/2012 | | |
| DE | 19849685 A1 | 9/1999 | | |
| DE | 10001496 A1 | 7/2001 | | |
| DE | 20315585 U1 | 2/2004 | | |
| DE | 10355835 A1 | 11/2004 | | |
| DE | 102010002850 A2 | 8/2011 | | |
| DE | 102010049866 A1 | 5/2012 | | |
| EP | 0229350 A2 | 7/1987 | | |
| EP | 0583580 A2 | 2/1994 | | |
| EP | 1440857 A1 | 1/2003 | | |
| EP | 1440857 A1 * | 7/2004 | ................ | G05G 1/46 |
| EP | 1440857 B1 | 10/2005 | | |
| EP | 2826680 A1 | 7/2013 | | |
| EP | 2826680 A1 * | 1/2015 | ................ | B60T 7/06 |
| FR | 2748165 A1 | 10/1997 | | |
| FR | 2762650 A1 * | 10/1998 | ................ | G05G 1/30 |
| FR | 2762650 A1 | 10/1998 | | |
| FR | 2900618 A1 | 5/2006 | | |
| FR | 2887837 A1 * | 1/2007 | ............ | F16C 11/069 |
| FR | 2887837 A1 | 1/2007 | | |
| FR | 2893291 A1 | 5/2007 | | |
| FR | 2893291 A1 * | 5/2007 | ............ | B60T 11/18 |
| FR | 2900618 A1 * | 11/2007 | ............ | B60T 11/18 |
| JP | 2007203889 A | 8/2007 | | |
| KR | 1020060002429 | 1/2006 | | |

OTHER PUBLICATIONS

Machine Translation of FR 2893291, obtained Jul. 10, 2015.*
Machine Translation of FR 2887837, obtained Jul. 10, 2015.*
Machine Translation of FR 2900618, obtained Apr. 9, 2020.*
Machine Translation of FR 2762650, obtained Apr. 9, 2020.*
Office Action in MX Application No. MX/a/2015/005954, dated Jan. 30, 2018.
Examination Report in TR Application No. 2014/05928, dated Feb. 26, 2016.
Final Office Action in corresponding U.S. Appl. No. 14/276,760, dated Dec. 29, 2017.
Notification of Second Office Action in CN Appln No. 201410301045.2, dated Jun. 8, 2018.
Office Action in related CN Appln No. 201410301045.2 dated Nov. 1, 2017.
Examination Report dated Mar. 24, 2014 from German Patent Application No. 10 2013 212 558.5.
Non-Final Office Action dated Jul. 5, 2016 from U.S. Appl. No. 14/317,792.
Final Office Action dated Dec. 13, 2016, from U.S. Appl. No. 14/317,792.
Advisory Action dated Mar. 9, 2017, from U.S. Appl. No. 14/317,792.
Final Office Action dated Dec. 4, 2015, from U.S. Appl. No. 14/276,760.
Non-Final Office dated Mar. 18, 2016, from U.S. Appl. No. 14/276,760.
Final Office dated Sep. 27, 2016, from U.S. Appl. No. 14/276,760.
Non-Final Office dated Jul. 20, 2015, from U.S. Appl. No. 14/276,760.
Advisory Action dated Feb. 16, 2016, from U.S. Appl. No. 14/276,760.
Advisory Action dated Feb. 7, 2017, from U.S. Appl. No. 14/276,760.
Non-Final Office Action in U.S. Appl. No. 14/276,760, dated Aug. 30, 2017.
Non-Final Office Action in U.S. Appl. No. 15/455,825, dated Jan. 10, 2018.
Final Office Action in U.S. Appl. No. 15/455,825, dated May 3, 2018.
Non-Final Office Action in U.S. Appl. No. 15/455,825, dated Sep. 7, 2018.
Final Office Action in U.S. Appl. No. 15/455,825, dated Feb. 15, 2018.
Notice of Allowance in corresponding U.S. Appl. No. 14/276,760, dated Aug. 14, 2019.

* cited by examiner

DEVICES AND SYSTEMS FOR PREVENTING MISALIGNMENT IN VEHICLE BRAKE ASSEMBLIES

CROSS REFERENCE TO RELATED APPLICATIONS

This application is a Continuation application of U.S. application Ser. No. 16/412,531, filed May 15, 2019, which is a Divisional application of U.S. application Ser. No. 15/455,825, filed Mar. 10, 2017, which is a Divisional application of U.S. application Ser. No. 14/317,792, filed Jun. 27, 2014, which claims priority to German Application No. 102013212558.5, filed on Jun. 28, 2013, the entire contents each of which is incorporated by reference herein.

TECHNICAL FIELD

The present disclosure relates generally to devices and systems for preventing misalignment in vehicle brake assemblies. More specifically, the present disclosure relates to alignment devices, and assemblies and methods incorporating such devices, which prevent misalignment between an actuation lever, such as, for example, a pedal arm and a brake booster during construction of a vehicle's brake assembly.

BACKGROUND

Motor vehicles may include various braking systems that enable the driver of the vehicle to stop the vehicle by applying pressure to a brake pedal. The brake pedal, for example, is generally connected to the braking system via a pedal arm that transmits the force applied by the driver (i.e., via the pedal) to the braking system. Most contemporary vehicles, which utilize disc braking systems, further include a brake booster that amplifies the braking force provided by the pedal arm.

During construction of a vehicle's brake assembly, the brake booster is generally coupled to the pedal arm via a standard clevis connection, for example, in which a clevis attached to the booster is fit over the pedal arm (i.e., in alignment with a set of bushing holes in the pedal arm), and a clevis pin is inserted to attach the booster to the pedal arm. Although the clevis assembly is intended to guide the brake booster into proper alignment with the pedal arm, there is room for operator error during the construction process, which may result in various misalignments between the booster and pedal arm. Such misassemblies between the booster and pedal arm (which are both critical portions of the vehicle's braking system) may, for example, lead to the malfunction and/or failure of the braking system, which poses a great safety concern, as well as requiring costly repairs to the vehicle.

It may, therefore, be advantageous to provide alignment devices, and brake pedal assemblies and methods incorporating such devices, which prevent misalignment between the pedal arm and brake booster during construction of a vehicle's brake assembly.

SUMMARY

In accordance with various exemplary embodiments of the present disclosure, a vehicle brake assembly may include an actuation lever coupled to a brake pedal, and a push rod of a brake booster. The push rod may have a clevis on an end portion thereof. The actuation lever is configured to be pivotally supported between two prongs of the clevis via a clevis pin. The assembly may further include at least one alignment device configured to guide and position the clevis on the push rod into alignment with the actuation lever during construction of the brake assembly.

In accordance with various additional exemplary embodiments of the present disclosure, an alignment device may include a saddle element configured to sit on a pedal arm of a brake assembly. The saddle element may include first and second U-shaped ends configured to receive the pedal arm. The first and second U-shaped ends may be spaced apart from one another by an opening defined by first and second lateral wing elements. The first and second lateral wing elements may form a catchment area configured to guide and position a push rod of a brake booster into alignment with the pedal arm.

In accordance with various additional exemplary embodiments of the present disclosure, a vehicle brake pedal assembly may include a pedal arm comprising a pair of bushing holes on opposite sides of the arm. The assembly may further include an alignment device comprising a saddle element comprising first and second U-shaped ends that receive the pedal arm. The first and second U-shaped ends may be spaced apart from one another by an opening defined by first and second lateral wing elements. The first and second lateral wing elements may form a catchment area configured to guide and position a push rod of a brake booster into alignment with the pedal arm.

In accordance with various further exemplary embodiments of the present disclosure, a method of constructing a vehicle brake assembly may include joining an alignment device with an actuation lever coupled to a brake pedal of the assembly or a push rod of a brake booster of the assembly. The method may additionally include guiding the push rod of the brake booster into alignment with the actuation lever via the alignment device. The method may further include coupling the push rod of the brake booster to the actuation lever.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a vehicle brake assembly including an actuation lever (i.e., that is coupled to a brake pedal), a push rod (i.e., of a brake booster), and at least one alignment device that is configured to guide and position a clevis on an end of the push rod into alignment with the actuation lever during construction of the brake assembly. In various embodiments, the at least one alignment device may include a body and at least one sliding surface that extends laterally away from the body to guide and position the clevis into alignment with the actuation lever.

Various exemplary embodiments of the present disclosure contemplate, for example, an alignment device comprising first and second sliding surfaces running obliquely to one another. In this manner, the sliding surfaces form a pair of lateral wing elements that extend laterally away from the body to form a catchment area (i.e., spanning between the wings). For instance, the embodiments described herein contemplate an alignment device that is configured to be affixed to a pedal arm of the brake assembly (which acts as the actuation lever), and which may guide and position the push rod of the brake booster into proper alignment with the pedal arm via the catchment area during construction of the brake assembly.

Various embodiments described herein, for example, contemplate an alignment device comprising a saddle element that is configured to sit on the pedal arm. The saddle element comprises first and second U-shaped ends that are configured to receive the pedal arm. In various embodiments, for example, the first and second U-shaped ends are spaced apart from one another by an opening that is defined by first and second lateral wing elements. In this manner, when the device is seated on the pedal arm, the wing elements may extend angularly outward from the pedal arm (which is exposed via the opening) to guide and position the clevis of the push rod into proper alignment with the pedal arm (i.e., through the opening in the structure), thereby preventing misassembly of the booster and pedal arm.

Figure 1:
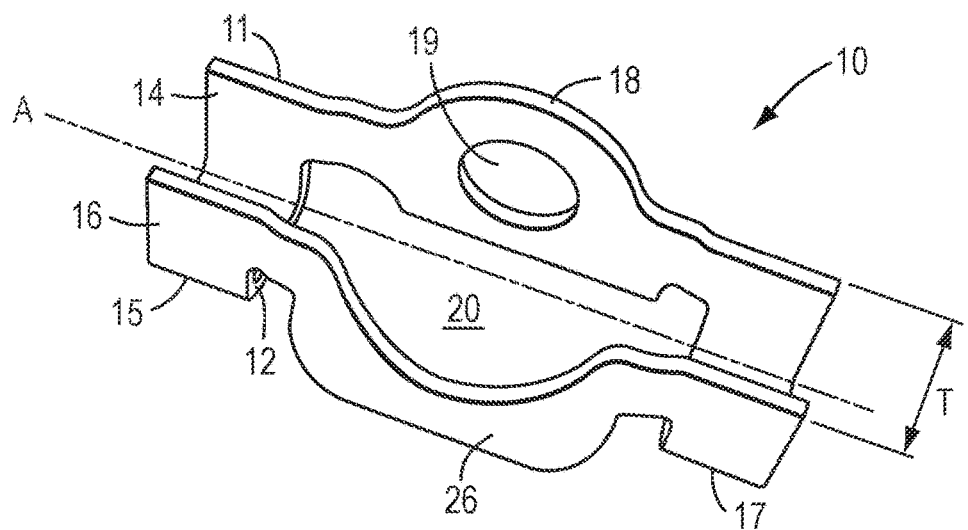
FIG. 1 is a perspective view of an exemplary embodiment of an alignment device in accordance with the present disclosure.
Figure 2:
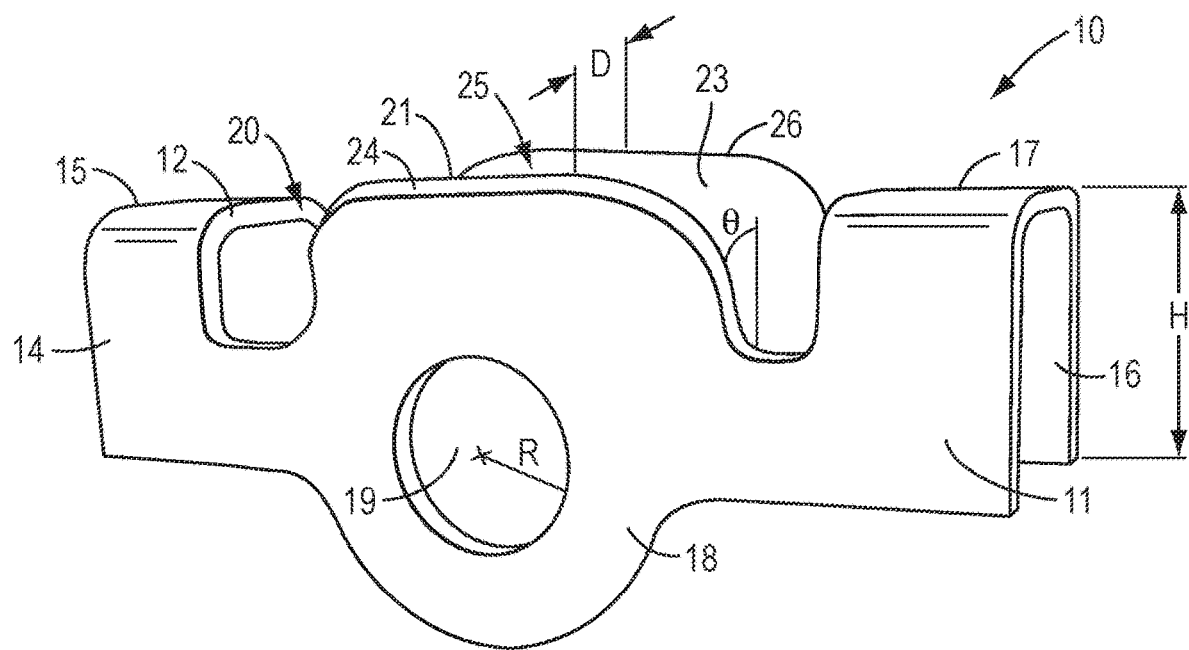
FIG. 2 is another perspective view of the alignment device of FIG. 1.
Figure 3:
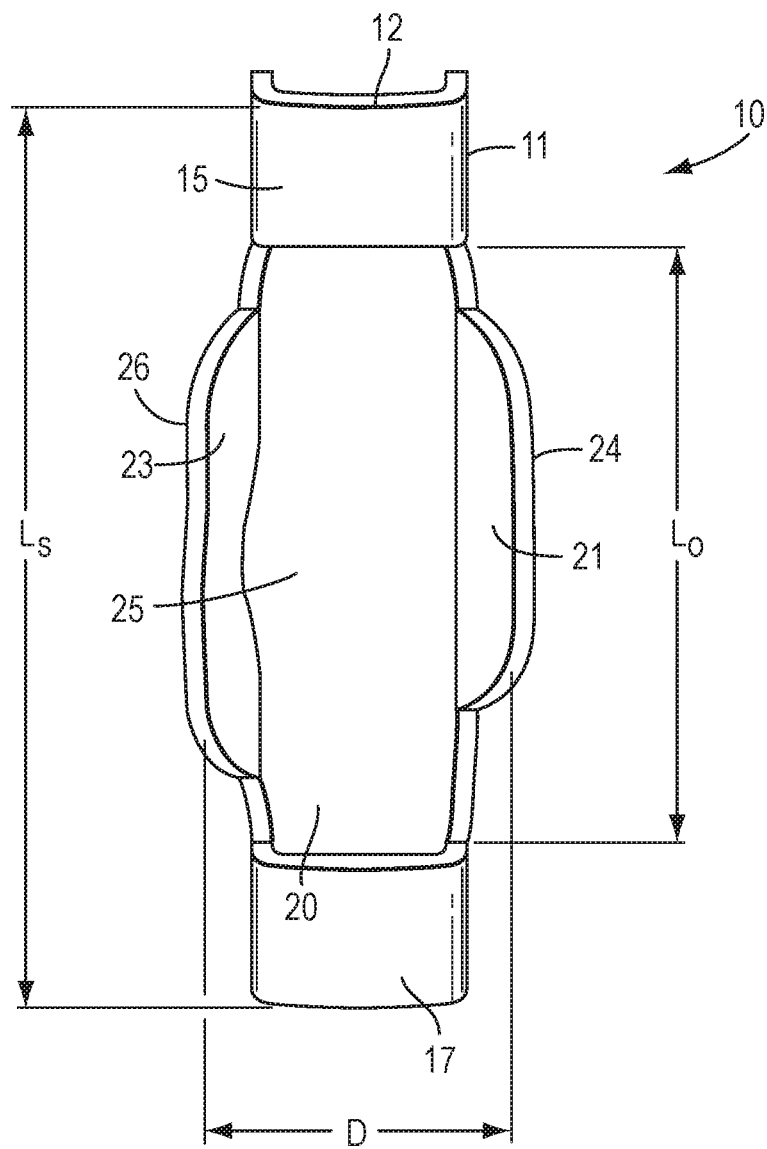
FIG. 3 is a top view of the alignment device of FIG. 1.
Figure 4:
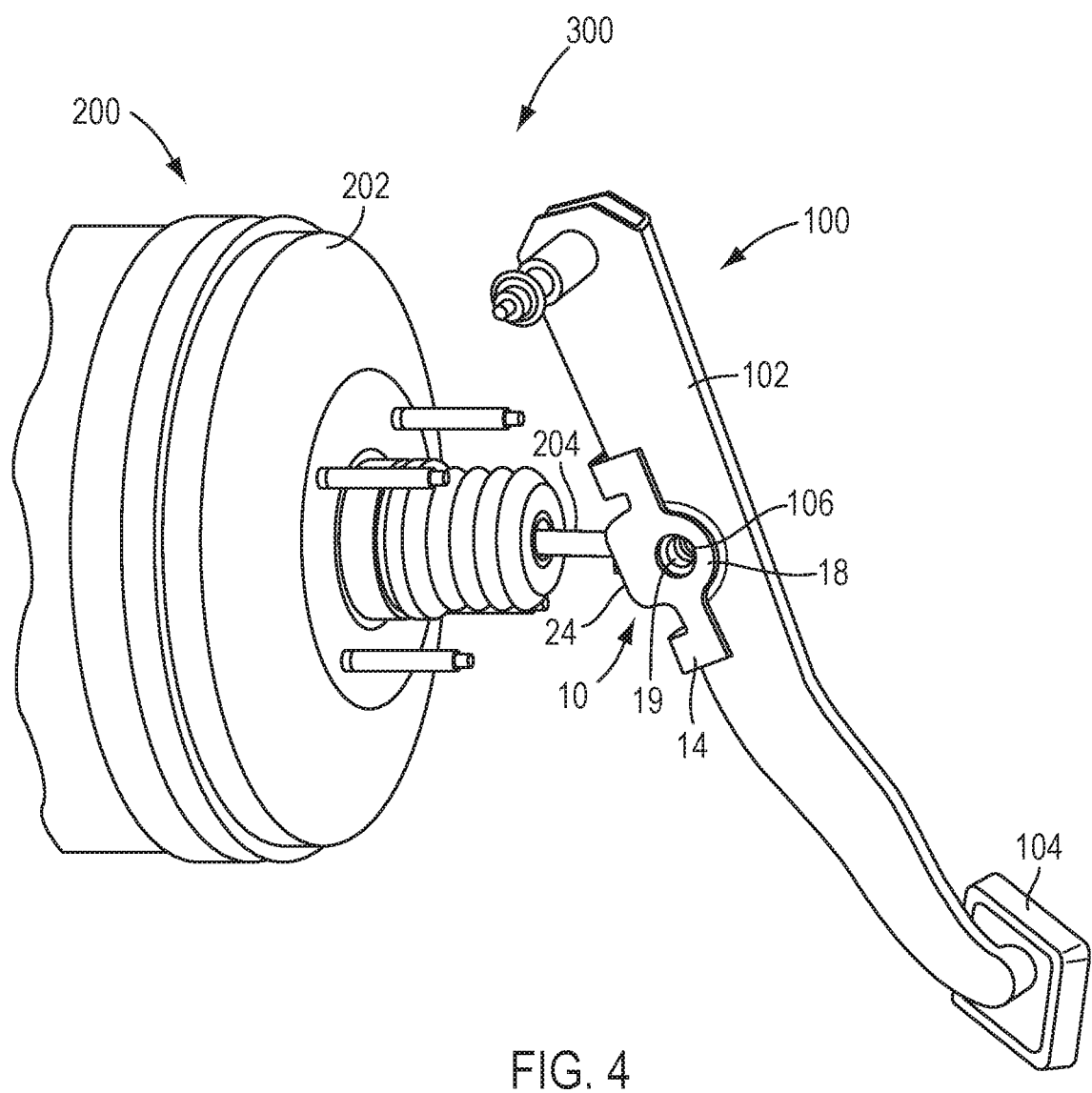
FIG. 4 is a perspective view of an exemplary embodiment of a vehicle brake assembly, including a brake pedal assembly, in accordance with the present disclosure, which illustrates the alignment device of FIG. 1 affixed to a pedal arm of the brake pedal assembly.
Figure 5:
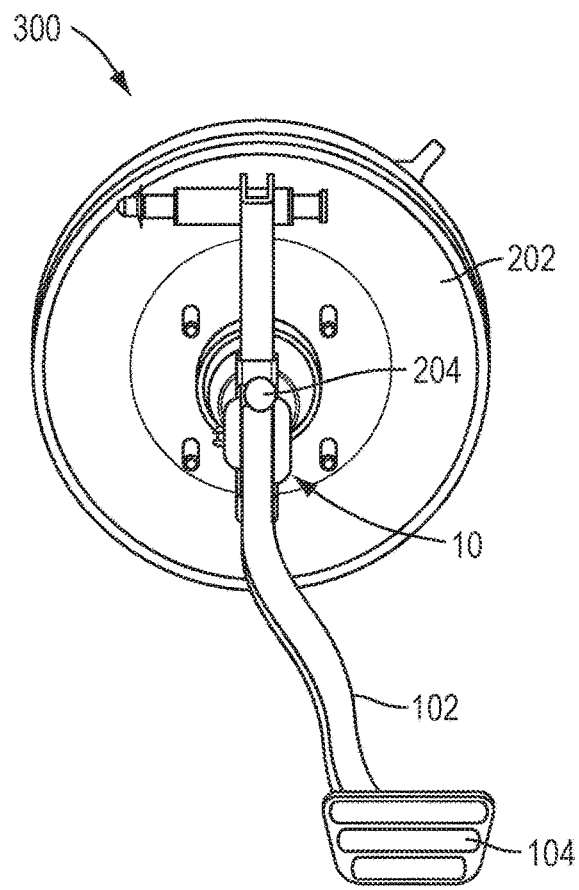
FIG. 5 is a front view of the vehicle brake assembly of FIG. 4.
Figure 6:
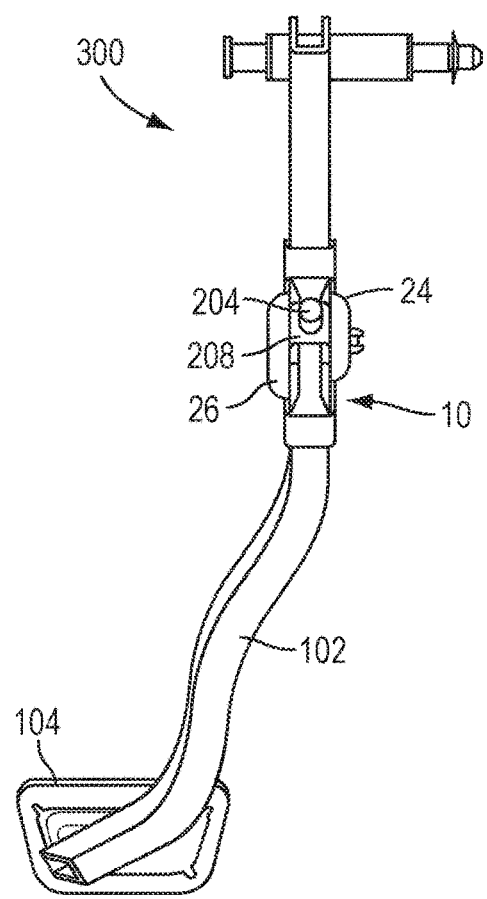
FIG. 6 is a rear view of the vehicle brake assembly of FIG. 4.

FIGS. 1-3 illustrate an exemplary embodiment of an alignment device 10 in accordance with the present disclosure. The alignment device 10 includes a body comprising a saddle element 11 that includes a base 12 and a pair of sidewalls 14, 16. As shown in FIGS. 1 and 2, the sidewalls 14, 16 of the saddle element 11 extend in parallel from the base 12 to form first and second U-shaped ends 15, 17 that are configured to receive a pedal arm of a vehicle brake assembly. As shown best perhaps in FIG. 3, the first and second U-shaped ends 15, 17 are spaced apart from one another by an opening 20 that is defined by first and second sliding surfaces 21, 23 that form first and second wing elements 24, 26 (which extend angularly outward from each respective sidewall 14, 16). In various additional embodiments, at least one of the sidewalls 14, 16 may include a flange 18 with a circular bore 19 such that, when the device 10 is seated on the pedal arm, the bore in the sidewall is aligned with a bushing hole in the pedal arm (see FIG. 4).

As illustrated in FIGS. 1-6, in various exemplary embodiments, the saddle element 11 is, therefore, substantially U-shaped such that, when the device 10 is seated on the pedal arm, the device 10 wraps at least partially around the pedal arm to envelope an area in which a brake booster is coupled to the pedal arm (see FIGS. 4-6), while still allowing access to this area through the opening 20 between the U-shaped ends 15, 17. In various embodiments, for example, the saddle element may have a length $L_S$ of about 84.5 mm to about 85.5 mm, a height H of about 22.5 mm to about 23.5 mm, and a thickness T of about 21.0 mm to about 22.0 mm, with an opening 20 having the same thickness T extending a length $L_O$ of about 57 mm to about 58 mm along a longitudinal axis A of the saddle element 11 (i.e., extending a length Lo between the u-shaped ends 15, 17).

As illustrated in FIGS. 2 and 3, the lateral wing elements 24, 26 extend outwardly from each respective sidewall 14, 16 at an angle θ to define the opening 20. In various embodiments, for example, the opening 20 may extend along the base 12 of the saddle element 11 (i.e., along the longitudinal axis A of the device 10) between the U-shaped ends 15, 17. In various embodiments for example, the wings 24, 26 may extend outwardly from each respective sidewall 14, 16 at an angle θ of about 26 degrees to about 36 degrees.

The wing elements 24, 26 may, therefore, define a catchment area 25 spanning a distance D across the saddle element 11 and opening 20. In various embodiments, for example, the catchment area 25 may span a distance D of about 29 mm to about 30 mm across the saddle element 11. In other words, the wing elements 24, 26 may have a wingspan of about 35 mm to about 36 mm that is oriented substantially perpendicular to the longitudinal axis A of the alignment device 10.

Figure 7:
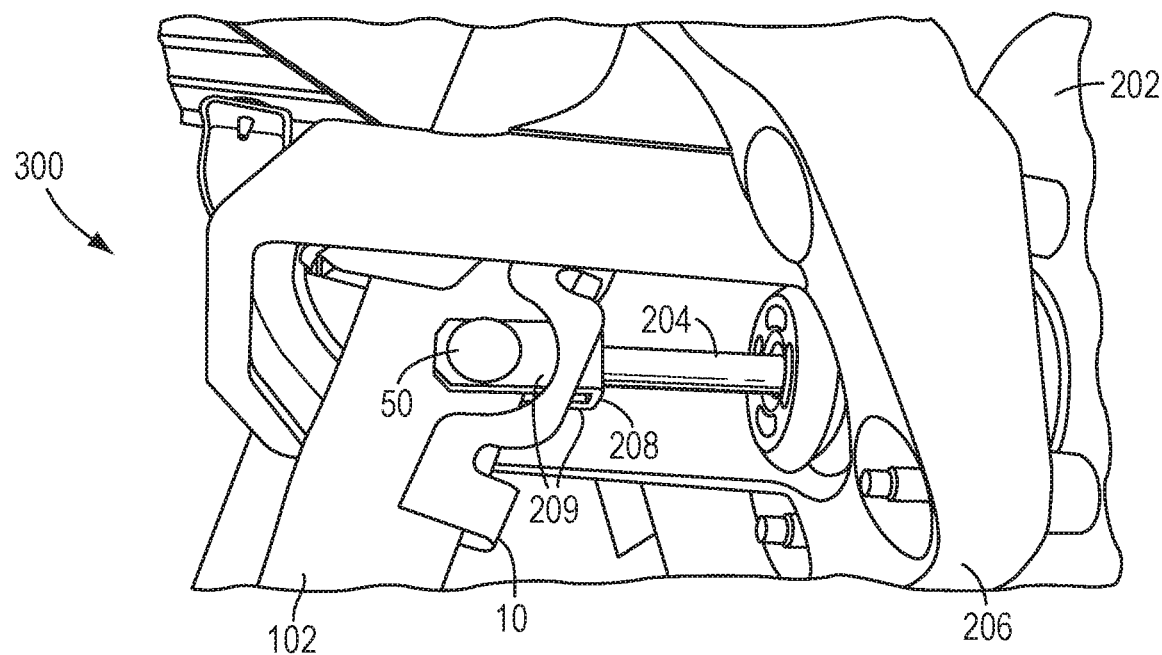
FIG. 7 is a partial, side view of the vehicle brake assembly of FIG. 4.

Thus, when the alignment device 10 is seated on the pedal arm, the wing elements 24, 26 may extend outwardly (e.g., at an angle θ) from each side of the pedal arm to catch a push rod of a brake booster (i.e., within the catchment area 25) and guide and position the push rod into proper alignment with the pedal arm (i.e., through the opening 20 between the U-shaped ends 15, 17). That is, the wing elements 24, 26 form a guide that is configured to receive prong elements of the push rod and align those elements on either side of the pedal arm so that the prongs are between a respective wing element 24, 26 and side wall of the pedal arm (See, e.g., FIGS. 7 and 8).

Those of ordinary skill in the art would understand that the alignment device 10 described above with reference to the embodiment of FIGS. 1-6 is exemplary only and that alignment devices in accordance with the present disclosure may have various configurations, shapes (i.e., having various cross-sections), and/or dimensions, which include, for example, various configurations, shapes, and/or dimensions of openings 20 and wing elements 24, 26, without departing from the scope of the present disclosure and claims. Furthermore, alignment devices in accordance with the present disclosure may be formed of various materials, including, but not limited to, steel, aluminum, plastic, ceramic, and/or various composites thereof.

As above, various embodiments of the present disclosure contemplate a vehicle brake assembly including, for example, at least one alignment device 10 as described above. FIGS. 4-8 illustrate, for example, a vehicle brake assembly 300 comprising a vehicle brake pedal assembly 100 that is coupled to a brake booster assembly 200. In accordance with various embodiments, the brake pedal assembly 100 may include an actuation lever, such as, for example, a brake pedal arm 102 that is coupled to a brake pedal 104; and the brake booster assembly 300 may include a push rod 204 having a clevis 208 on an end portion thereof. In this manner, to construct the brake assembly 300, the actuation lever is configured to be pivotally supported between two prongs 209 of the clevis 208, for example, via a clevis pin 50 (see FIGS. 7 and 8). Those of ordinary skill in the art would understand that the vehicle brake assembly 300 of FIGS. 4-8 is exemplary only and that such assemblies may have various configurations and/or additional components that are not illustrated in the figures. A booster bracket 206 and a clevis pin 50 are not illustrated in the view of FIGS. 4-6, for example, to provide a better view of the brake pedal assembly 100.

As shown in the embodiment of FIGS. 4-8, in accordance with various embodiments, the brake pedal assembly 100 includes an actuation lever (e.g., pedal arm 102), a brake pedal 104, and an alignment device 10. In various exemplary embodiments, the alignment device 10 is integrally formed with the pedal arm 102 In various additional embodiments, the alignment device 10 is affixed to the pedal arm 102. For example, in various embodiments, the alignment device may be welded to the pedal arm 102.

As above, the alignment device 10 may include a body comprising a saddle element 11 that wraps at least partially around the pedal arm 102 to envelope the area on the pedal arm 102 in which the brake booster assembly 200 is coupled to the pedal arm 102, while still allowing access to this area through an opening 20 between first and second U-shaped ends 15, 17 of the saddle element 11. As best shown perhaps in FIG. 4, in various embodiments, for example, at least one of the sidewalls 14, 16 of the saddle element 11 may include a flange 18 with a circular bore 19 (the sidewall 24 including the flange 18 in the illustrated embodiment of the alignment device 10), and the alignment device 10 may be positioned on the pedal arm 102 such that the circular bore 19 in the sidewall 24 is aligned with a bushing hole 106 in the pedal arm 102.

Figure 8:
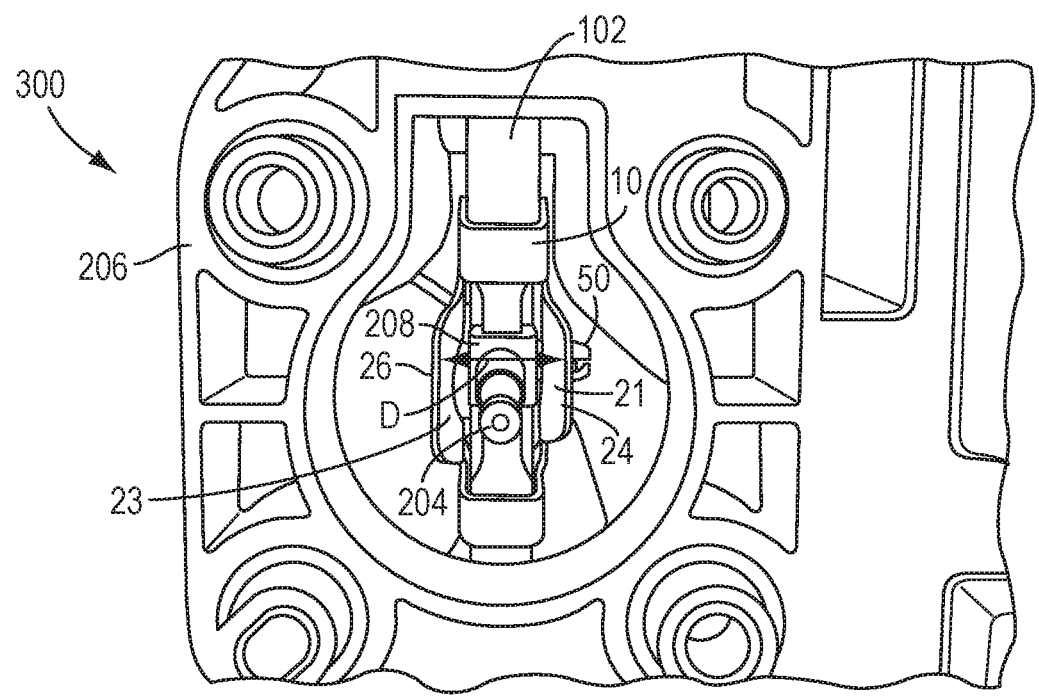
FIG. 8 is a partial, front view of the vehicle brake assembly of FIG. 4.

As shown best perhaps in FIG. 8, the alignment device 10 may further include at least one sliding surface, two sliding surfaces 21, 23 being shown in the embodiment of FIGS. 4-8, that extend laterally away from the body of the device 10 to guide and position the clevis 208 on the push rod 204 into alignment with the actuation lever (e.g., brake pedal arm 102). In other words, the sliding surfaces 21, 23 run obliquely to one another such that distal ends of each of the sliding surfaces 21, 23 are situated at a greater distance apart from one another than proximal ends of each of the sliding surfaces. The opening 20 is, therefore, defined by the sliding surfaces 21, 23, which form first and second wing elements 24, 26 that extend outwardly from each respective sidewall 14, 16 of the saddle element 11 (e.g., at an angle θ) on each side of the pedal arm 102. In this manner, the wing elements 24, 26 may form a catchment area 25 (or a funnel) spanning a distance D across the pedal arm 102 (i.e., across the saddle element 11 and the opening 20) to guide and position the brake booster assembly 200 into proper alignment with the pedal arm assembly 100.

As above, in various exemplary embodiments, the brake booster assembly 200 comprises a brake booster 202 having a push rod 204 that is configured to be coupled to the pedal arm 102 via a clevis 208. The pedal arm 102 comprises, for example, a pair of bushing holes 106 on opposite sides of the arm 102 (only one bushing hole 106 being visible in the view of FIG. 4), which are configured to be aligned with holes in the clevis 208. As would, therefore, be understood by those of ordinary skill in the art, when the brake booster 202 is in proper alignment with the pedal arm 102 (i.e., in a position to be properly assembled with the pedal arm 102), the clevis 208 will sit on the pedal arm 102 such that a hole 210 in each prong 209 of the clevis 208 aligns with one of the bushing holes 106 of the pedal arm 102 (i.e., such that the prongs 209 of the clevis 208 rest on opposite sides of the pedal arm 102). A clevis pin 50 may then be inserted through the aligned holes 210 and 106 to secure the push rod 204 to the pedal arm 102.

Figure 9:
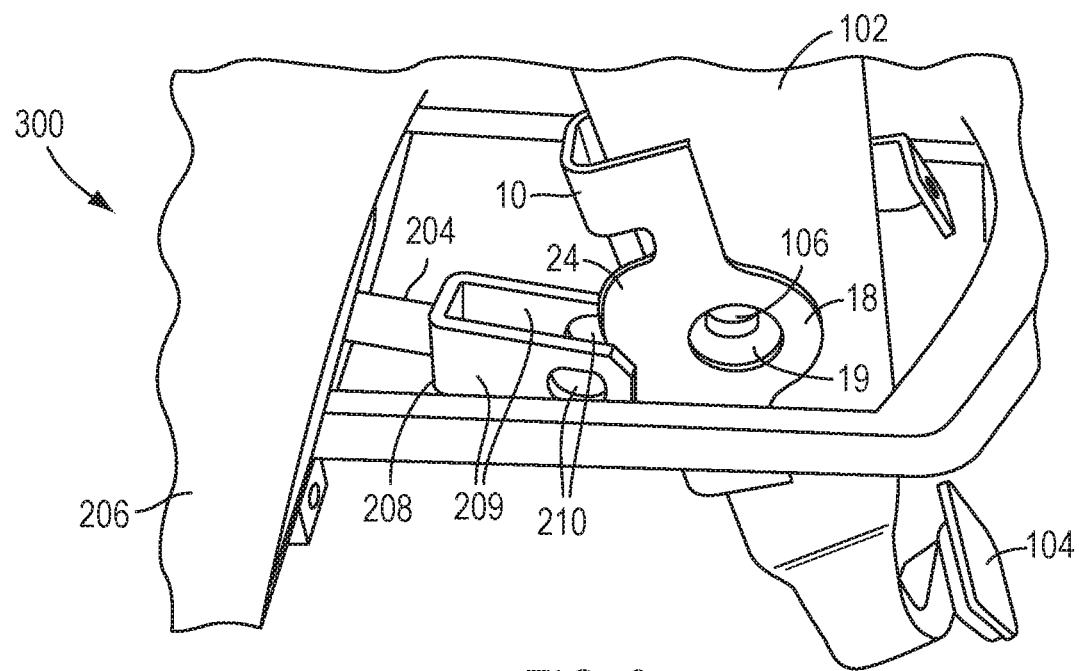
FIG. 9 is a partial, side view of the vehicle brake assembly of FIG. 4 illustrating how the alignment device prevents misalignment of a brake booster and the pedal arm.
Figure 10:
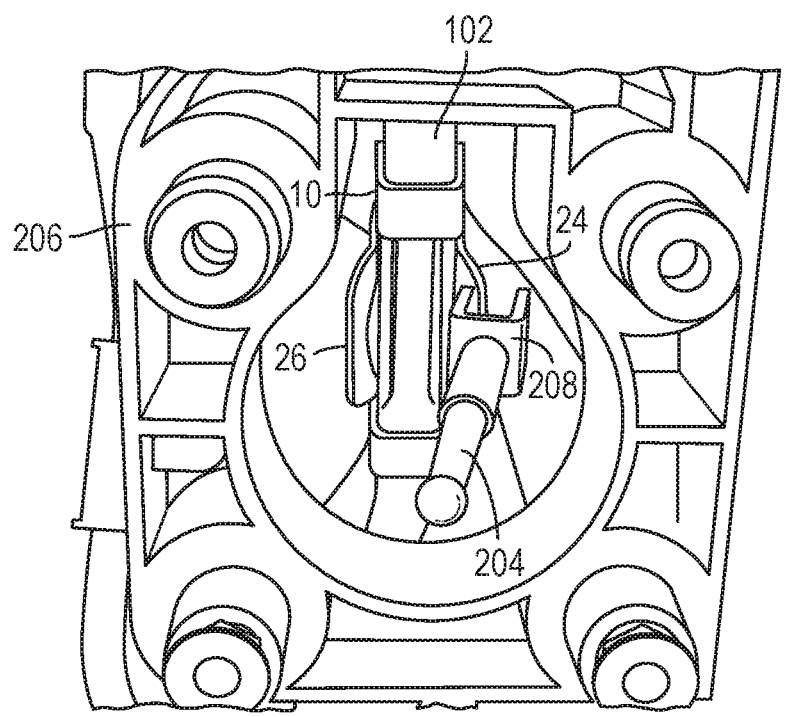
FIG. 10 is a partial, front view of the vehicle brake assembly of FIG. 4 illustrating how the alignment device prevents misalignment of the brake booster and the pedal arm.

As shown in FIGS. 7-10, the wing elements 24, 26 of the alignment device 10 may, therefore, extend outwardly from each side of the pedal arm 102 to catch the push rod 204 of the brake booster 202 (i.e., within the catchment area 25) and guide and position the push rod 204 (i.e., along the sliding surfaces 21, 23) into proper alignment with the pedal arm 102 (i.e., through the opening 20 between the U-shaped ends 15, 17). In this manner, as shown in FIGS. 9 and 10, the wing elements 24, 26 may prevent the clevis 208 of the push rod 204 from being misaligned with the pedal arm 102 (e.g., by being positioned along one side of the pedal arm 102), by preventing the alignment of the holes 210 and 106, and thus insertion of the clevis pin 50, unless the clevis 208 is properly aligned with the pedal arm 102. In other words, the wing elements 24, 26 may guide the clevis 208 over the pedal arm 102 such that a prong 209 is positioned on each side of the pedal arm 102 and the holes 210 of the clevis 208 are in alignment with the bushing holes 106 of the pedal arm 102.

In various embodiments, for example, the push rod 204 is generally allowed only about 7 mm of movement in any one direction, and the alignment device 10 is dimensioned such that it is not possible to move the clevis 208 of the push rod 204 out of alignment with the pedal arm 102 (within its allotted area of movement) without the wing elements 24, 26 interfering with the clevis 208. In accordance with various embodiments, for example, there is a span of about 16.4 mm between the prongs 209 of the clevis 208, and only a space of about 4.5 mm between a side portion of the pedal arm 102 and the alignment device 10 (i.e., when the alignment device 10 is seated on the pedal arm 102). The clevis 208 will, therefore, not fit between the alignment device 10 and the pedal arm 102, and the wing elements 24, 26 will interfere with the prongs 208 of the clevis 208 if the push rod 204 is rotated outward within its 7 mm of movement.

Those of ordinary skill in the art would understand that the vehicle brake assembly 300 and the vehicle brake pedal assembly 100 described above with reference to the embodiment of FIGS. 4-10 are exemplary only and that vehicle brake assemblies and brake pedal assemblies in accordance with the present disclosure may have various configurations and/or components, including various types and/or configurations of actuation levers (e.g., pedal arms 102) and brake pedals 104, without departing from the scope of the present disclosure and claims. Furthermore, as above, vehicle brake assemblies and brake pedal assemblies in accordance with the present disclosure may include various types and/or configurations of alignment devices 10, having various shapes and/or dimensions, which are coupled to the pedal arm 102 and/or any other portion of either of the assemblies, via various methods and/or techniques.

Figure 11:
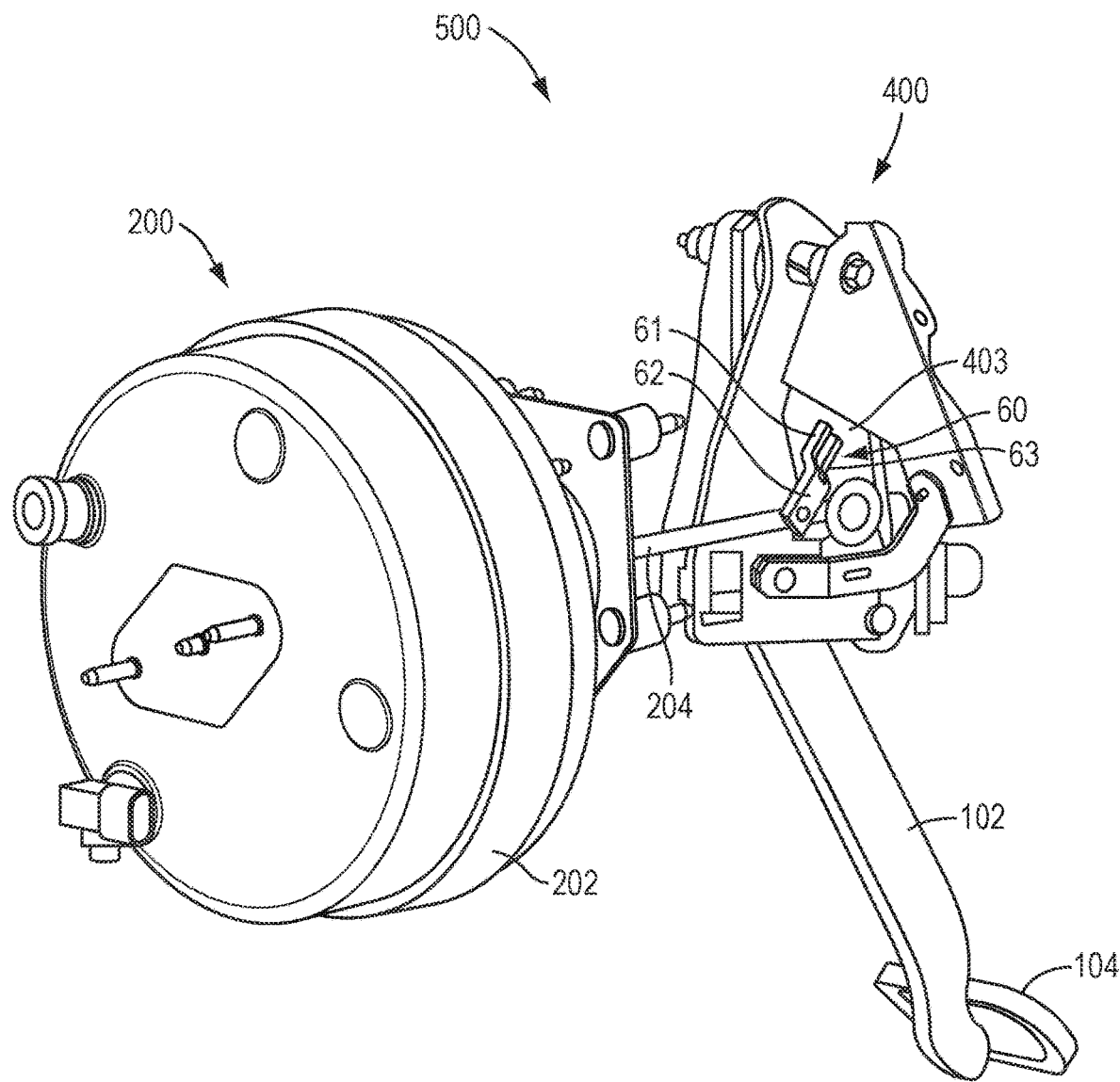
FIG. 11 is a perspective view of another exemplary embodiment of a vehicle brake assembly, including a brake pedal assembly, in accordance with the present disclosure, which illustrates another exemplary embodiment of an alignment device in accordance with the present disclosure.

As illustrated in FIG. 11, for example, in various additional embodiments, a vehicle brake assembly 500 may comprise a vehicle brake pedal assembly 400 including an actuation lever 403 that is coupled to the brake pedal arm 102. Accordingly, in the embodiment of FIG. 11, to construct the brake assembly 500, the brake booster 202 is connected to the pedal arm 102 via the actuation lever 403.

Figure 12:
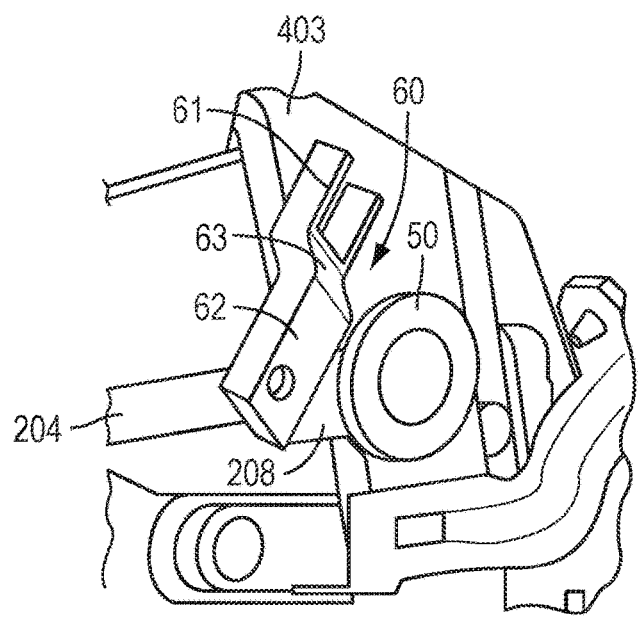
FIG. 12 is a partial, enlarged view of the vehicle brake assembly of FIG. 11.
Figure 13:
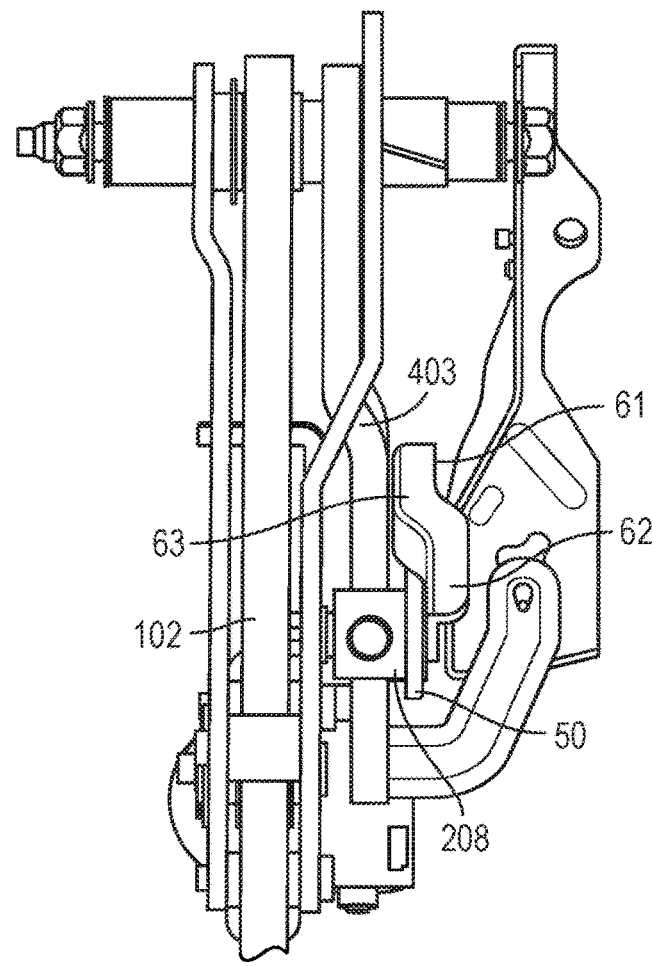
FIG. 13 is a partial, rear view of the vehicle brake assembly of FIG. 11.

As shown in FIGS. 11-13, in such embodiments, an alignment device 60 may be coupled to the actuation lever 403. Similar to the alignment device 10 illustrated in FIGS. 1-10, the alignment device 60 may include a body 61 that is configured to be connected to the actuation lever 403, and a sliding surface 62 that extends laterally away from the body 61 to guide and position the clevis 208 on the push rod 204 into alignment with the actuation lever 403. In various embodiments, for example, the sliding surface 62 of the alignment device 60 has an offset 63, such that the sliding surface 62 runs substantially parallel to the body 61 at a predefined distance therefrom. In other words, the predefined distance between the sliding surface 62 and the body 61 (set by the offset 63) defines the distance that the clevis 208 of the push rod 204 may be positioned along the side of the actuation lever 403 (i.e., in the event of a misalignment between the push rod 204 and the actuation lever 403), and may prevent connection of the actuation lever 403 with the clevis 204 via the clevis pin 50.

Figure 14:
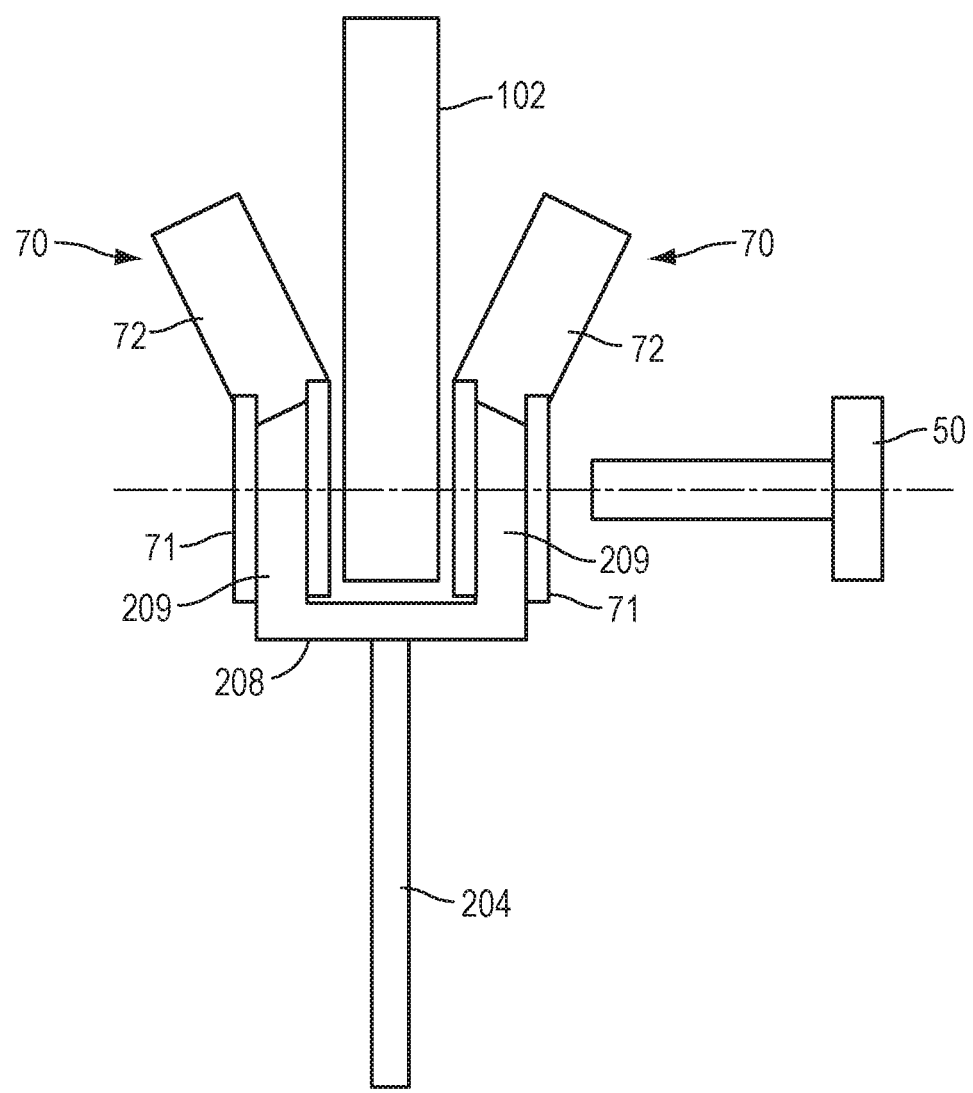
FIG. 14 is a schematic view of yet another exemplary embodiment of an alignment device, in accordance with the present disclosure, that is coupled to a push rod of a brake booster of a vehicle brake assembly.

In various further embodiments, at least one alignment device may be coupled to the push rod of the brake booster, such as, for example, to the clevis 208 of the push rod 204, to guide and position the clevis 208 on the push rod 204 into alignment with the actuation lever (e.g., brake pedal arm 102) during construction of the brake assembly. As illustrated in FIG. 14, for example, in various embodiments, an alignment device 70 may be fitted on each prong 209 of the clevis 208 of the push rod 204. Similar to the alignment devices 10 and 60 described above, each alignment device 70 may include a body 71 that is configured to be connected to a respective prong 209 of the clevis 208 (e.g., by sliding over the prong 209), and a sliding surface 72 that extends laterally away from each body 71. In this manner, as shown in FIG. 14, the sliding surfaces 72 may form a funnel to guide and position the clevis 208 on the push rod 204 into alignment with the brake pedal arm 102, such that the push rod 204 and pedal arm 102 may be connected via the clevis pin 50.

Figure 15:
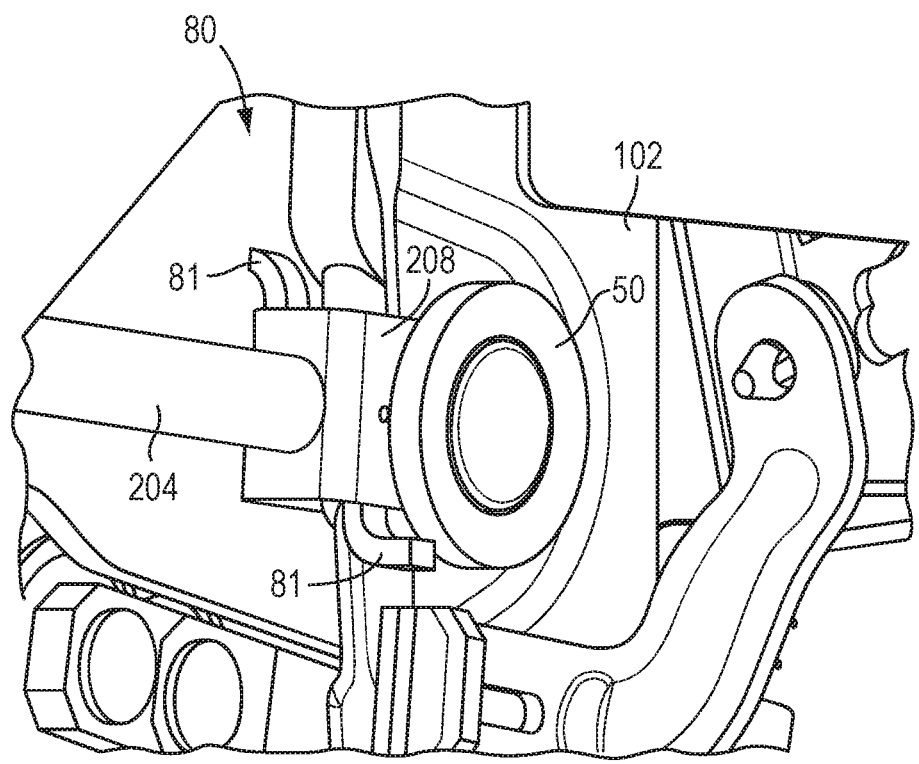
FIG. 15 is a perspective view of another exemplary embodiment of a vehicle brake assembly, which illustrates yet another exemplary embodiment of an alignment device in accordance with the present disclosure.
Figure 16:
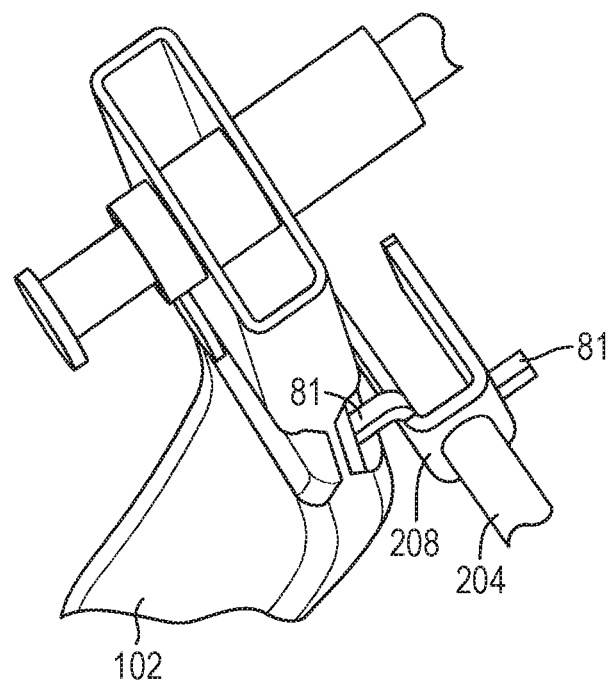
FIG. 16 is a partial, top view of the vehicle brake assembly of FIG. 15 illustrating how the alignment device prevents misalignment of the brake booster and the pedal arm.

As illustrated in FIGS. 15 and 16, in various additional embodiments, an alignment device 80 may be fitted on each prong 209 of the clevis 208 of the push rod 204. Each alignment device 80 may include, for example, a spacer lug 81 that extends laterally outward for a predefined distance from each respective prong 209. In other words, the predefined distance (set by each spacer lug 81) may define the distance that the clevis 208 of the push rod 204 may be positioned along each side of the brake pedal arm 102 (i.e., in the event of a misalignment between the push rod 204 and the pedal arm 102 as shown in FIG. 16), and may prevent connection of the actuation lever 102 with the clevis 204 via the clevis pin 50.

The spacer lugs 81 may be fitted on the prongs 209 of the clevis 204 via any methods and/or techniques known to those of ordinary skill in the art, including, for example, being integrally formed with the prongs 209 when the clevis is manufactured.

The present disclosure further contemplates methods of constructing a vehicle brake assembly, such as, for example, the vehicle brake assemblies 300, 500 including the vehicle brake pedal assemblies 100, 400 and the brake booster assembly 200 described above with reference to FIGS. 4-16. In accordance with various exemplary embodiments, to construct a vehicle brake assembly 300, 500, an alignment device 10, 60, 70, 80 is joined to an actuation lever 102, 403 of the vehicle brake pedal assembly 100, 400, or to a push rod 204 of a brake booster assembly 202 of the brake booster assembly 200. As above, in various embodiments, an alignment device 10, 60, 70 may include at least one sliding surface 21, 23, 61, 71 that extends laterally away from a body of the device. In various embodiments, for example, as illustrated in FIGS. 4-10, an alignment device 10 may include a pair of lateral wing elements 24, 26 extending outwardly relative to the brake pedal arm 102 to define a catchment area 25 between the wing elements 24, 26.

In various embodiments, the alignment device 10, 60, 70, 80 may be joined to actuation lever 102, 403 or the push rod 204 by welding the alignment device 10, 60, 70, 80 to the actuation lever 102, 403 or the push rod 204. In various additional embodiments, the alignment device 10, 60, 70, 80 may be integrally formed with the actuation lever 102, 403 or the push rod 204, such as, for example, by being molded with the actuation lever 102, 403 or the push rod 204. As would be understood by those of ordinary skill in the art, however, the alignment device 10, 60, 80, 80 may be joined to the actuation lever 102, 403 or the push rod 204 using various techniques and/or methods, without departing from the scope of the present disclosure and claims.

The push rod 204 of the brake booster 202 is then guided into alignment with the actuation lever 102, 403 via the alignment device 10, 60, 70, 80; and coupled to the actuation lever 102, 403 via, for example, a clevis pin 50.

In various embodiments, for example, as illustrated in FIGS. 4-10, the push rod 204 may be guided into the catchment area 25 (i.e., defined by the wing elements 24, 26) to align the push rod 204 with the actuation lever (i.e., pedal arm 102). As above, in various embodiments, the pedal arm 102 may include a pair of bushing holes 106 on opposite sides of the pedal arm 102, which are configured to be aligned with holes in a clevis 208 at an end of the push rod 204. Thus, the push rod 204 is guided into the catchment area 25 such that the clevis 208 at the end of the push rod 204 is aligned with the pedal arm 102. In other words, the clevis 208 is guided over the pedal arm 102 by the wing elements 24, 26, such that a prong 209 on each side of the clevis 208 is positioned on each side of the pedal arm 102 and a hole 210 in each prong 209 is aligned with one of the bushing holes 106 in the pedal arm 102.

When the push rod 204 is in proper alignment with the pedal arm 102, the push rod 204 is then coupled to the pedal arm 102, for example, by inserting a clevis pin 50 through the aligned holes 210 and 106 of the clevis 208 and the pedal arm 102. As shown in FIGS. 9 and 10, for example, when the push rod 204 is not in proper alignment with the pedal arm 102, the clevis pin 50 may not be inserted, but is instead obstructed by the wing element 24, thereby preventing misassembly of the brake pedal assembly 100 and the brake booster assembly 200 during construction of the vehicle brake assembly 300. As above, the push rod 204 is generally allowed only about 7 mm of movement in any one direction, and the alignment device 10 is dimensioned such that it is not possible to move the clevis 208 of the push rod 204 out of alignment with the pedal arm 102 without the wing elements 24, 26 interfering with the clevis 208.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to motor vehicles incorporating power braking systems, those of ordinary skill in the art would understand that the present teachings as disclosed would work equally well for any type of vehicle, incorporating any type of braking system, which utilizes a similar clevis-type connection.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A vehicle brake assembly, comprising:
an actuation lever coupled to a brake pedal;
a push rod of a brake booster, the push rod having a clevis on an end portion thereof, the clevis comprising two prongs; and
an alignment device including a first portion that is connected to the actuation lever and a second portion that extends laterally away from the first portion, a longitudinal axis of the alignment device extends downwardly from the first portion to the second portion such that the first portion is disposed above the clevis;
wherein the second portion of the alignment device guides and positions at least one of the two prongs of the clevis into a position between the second portion of the alignment device and the actuation lever to align the two prongs of the clevis with the actuation lever for securing the clevis to the actuation lever during construction of the vehicle brake assembly.

2. The assembly of claim 1, wherein the actuation lever is a brake pedal arm.

3. The assembly of claim 1, wherein the actuation lever is coupled to a brake pedal arm.

4. The assembly of claim 1, wherein the first portion of the alignment device comprises a body and the second portion of the alignment device comprises a sliding surface, the sliding surface including an offset that extends transverse to the longitudinal axis of the alignment device and an arm that extends parallel to the longitudinal axis of the alignment device.

5. The assembly of claim 4, wherein the offset extends between the body of the first portion and the arm of the sliding surface, such that the arm runs parallel to the body at a predefined distance from the body.

6. The assembly of claim 5, wherein the predefined distance defines a distance that the clevis of the push rod can be positioned along a side of the actuation lever.

7. The assembly of claim 4, wherein the arm of the sliding surface is configured to create an obstruction to prevent connection of the actuation lever with the clevis of the push rod when there is a misalignment between the push rod and the actuation lever during construction of the vehicle brake assembly.

8. The assembly of claim 1, wherein each of the first and second portions of the alignment device extend parallel to the longitudinal axis of the alignment device.

9. The assembly of claim 8, wherein the first portion of the alignment device comprises a body and the second portion of the alignment device comprises a sliding surface, the sliding surface including an offset that extends transverse to the longitudinal axis of the alignment device and an arm that extends parallel to the longitudinal axis of the actuation lever.

10. The assembly of claim 9, wherein, to prevent connection of the actuation lever with the clevis during a misalignment between the actuation lever and the clevis, the arm limits a distance that the clevis may be positioned along a side of the actuation lever.

11. The assembly of claim 10, wherein the offset of the sliding surface defines the distance that the clevis may be positioned along the side of the actuation lever.

12. The assembly of claim 1, the at least one of the two prongs of the clevis is in direct contact with the actuation lever during construction of the brake assembly.

* * * * *